United States Patent Office 3,282,352
Patented Nov. 1, 1966

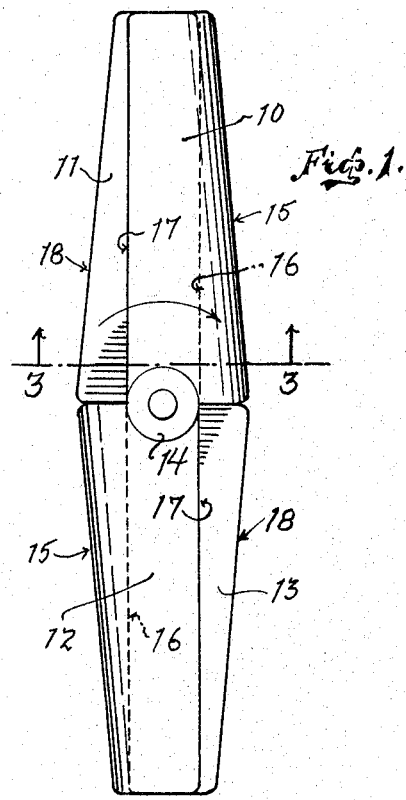
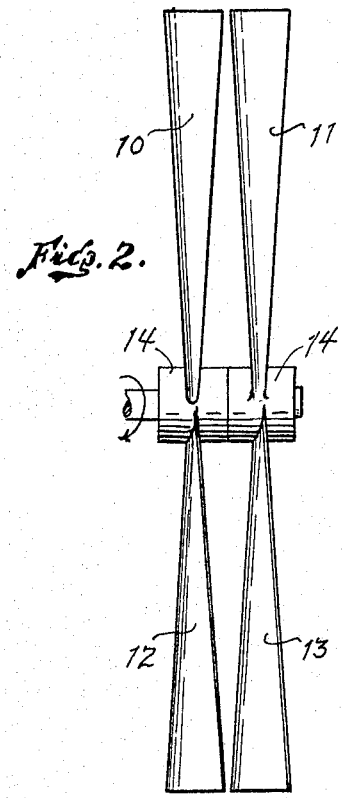
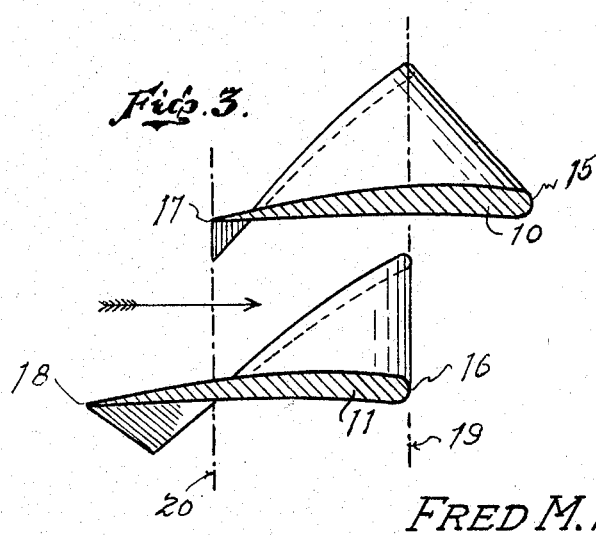

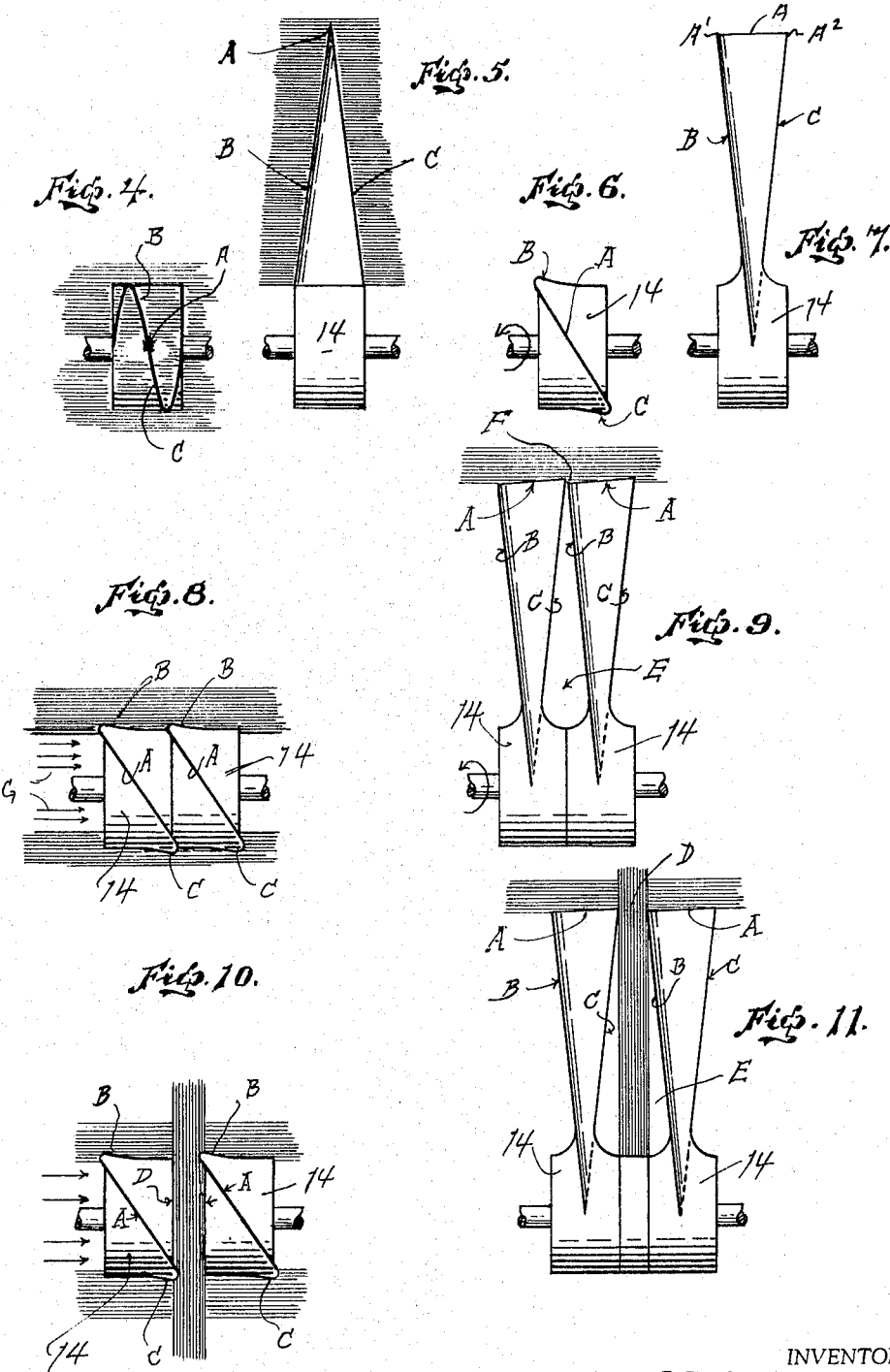

3,282,352
DUAL AIR SCREW PROPELLER
Fred M. Siptrott, 3011 Hardies Lane, Santa Rosa, Calif.
Filed Oct. 1, 1965, Ser. No. 491,961
6 Claims. (Cl. 170—165)

My present invention relates to aircraft and more particularly to a propeller of the air screw type and it has for its primary object the provision of propulsion means for aircraft in the form of an air screw by which a maximum of thrust can be effectively and efficiently developed with a piston type engine as its source of power.

Another object of the invention is to provide a propeller of the air screw type with staggered axially displaced blades by which a propulsive thrust is possible with a propeller of substantially smaller diameter than would be the diameter of a conventional screw propeller having an equal propulsive thrust.

A further object of the invention is to provide an aircraft propelling means of advanced design having blades of airfoil cross-section and with aerodynamic twist extending radially in spaced, staggered and overlapping relation in which each blade will take its individual bite in the air stream when in operation.

Another novel aspect and object of my invention is to provide a multi-blade aircraft propeller in which ambient air between the propeller blades operates to provide an additional propelling force free of the boundary layer of air about the blades to thus increase the aerodynamic efficiency of the propeller.

The success and universal adoption of jet propulsion over the piston engine driven propeller is largely attributable to the fact that for an equal thrust or propelling force, a propeller of conventional design would be of prohibitive diameter. The employment of the jet engine however has the objectionable feature or disadvantage in that it is expensive to manufacture and requires considerable more fuel of an expensive character than does a piston engine. It is, therefore, a further object of my invention to provide a propeller of the air screw type by which an aircraft propelling thrust comparable to the thrust of a jet engine can be obtained with a piston type engine under similar conditions of operation.

Other objects and advantages will be in part evident to those skilled in the art and in part pointed out hereinafter in connection with the accompanying drawing, wherein there is shown by way of illustration and not of limitation a preferred embodiment of the invention.

In the drawing:

FIGURE 1 is a front view in outline of a propeller constructed in accordance with a preferred embodiment of the invention, FIGURE 2 is a side view of the propeller of FIGURE 1, FIGURE 3 is a sectional view looking outwardly at the wide part of the propeller blades, as shown in FIGURE 1, FIGURES 4 through 11 are fragmentary diagrammatic views illustrating the theory and principle of the invention.

The force produced in driving an aircraft with a conventional propeller is the reaction obtained as the propeller pushes a certain mass of air backwards. This backward-moving air, called the slipstream, has kinetic energy due to its motion and this energy represents a loss. An other loss is due to the friction of the air on the blades and as a result the thrust power developed by the propeller is less than the power delivered to the propeller. One of the most important aims of the propeller design is to obtain a high ratio of useful power to engine power or in other words a highly propulsive efficiency.

While the jet engine drive has advantages over a power driven propeller, it consumes considerably more of a special fuel which is also more costly than that required by a piston engine. It is, therefore, evident, that to compete with the jet engine it will be necessary to improve the efficiency of the piston engine and/or design a propeller which will more efficiently deliver this power to useful work in the form of propulsive force. With this in mind, I have, by my invention, provided a propeller having four blades of special design and in a novel arrangement wherein two such blades extending radially from the hub in spaced and in overlapping substantially parallel relation provide in effect a non-constricting slot or airfoil body between the overlapping blades which results in each of the blades taking their required bite into the air without interference with each other.

For a more detailed description of my invention, reference is now made to the accompanying drawing, wherein my propeller is clearly shown in FIGURE 1 as having four individual blades, designated by the numerals 10, 11, 12 and 13 that are mounted upon a hub 14. These four blades are of non-conventional form in that the blades of each pair have corresponding and uniform chords. A further feature of the blades 10, 11, 12 and 13 is that the leading and trailing edges of the blades of each pair are disposed out of line and angularly with respect to each other. For example, as shown in this figure of the drawing the blade 10 has a leading edge 15 that is disposed forward of and angularly with respect to the leading edge 16 of the blade 11. In a similar manner, a trailing edge 17 of the blade 10 terminates in advance of a trailing edge 18 of the blade 11. At the other side of the hub 14, the blades 12 and 13 are of similar construction and arrangement both in chord and airfoil section throughout their lengths.

As shown in FIGURE 2, the blades of each pair are spaced axially upon the hub 14 so that there is provided a substantially uniform spacing or slot therebetween for the free movement of air when the propeller is in operation. While the propeller blades are here shown as carried by two separate hubs, it is to be understood that the propeller might be constructed with a single hub. It is, also, conceivable that if two separate hubs are employed, means might be provided for an adjustment in the angular and overlapping relationship between the blades. The twist of the blades is preferably aerodynamic in character and provides a slot between the propeller blades that is spiral in character. With the forward blade in a leading position, there will be practically no turbulence set up by the leading blades that will interfere with the operation of the trailing blades and when positioned in this manner each of the blades will in effect be operating in solid air.

As shown in FIGURE 3, the overlapping portions of the blades 10 and 11 and the blades 12 and 13 encompass a combined radially extending chord area of substantially uniform width movementwise, as indicated between dotted lines 19 and 20, of FIGURE 3 and what appears, in FIGURE 1, to be reduction in the chord of these blades is explained principally by the increasing twist or angle of attack as embodied therein. The arrangement here illustrated permits the two blades when joined together, as shown, to function in concert with a free energy exchange without any constriction of air therebetween and because of the parallel disposition of the airfoils, the two blades thus operating together will have reduced skin friction due to the minimum pitch at the hub with a drastic reduction in the slipstream. At the same time with the highest pitch or angle of approach of the blades at the extreme outer ends where the leverage and velocity are at a maximum, with the air slot as thus provided between the adjacent blades, there is formed what might be termed a bite of three dimensional magnitude.

As set forth above, my propeller is of an advanced airscrew type in particular and which, in its shape, is aerodynamic. It represents an advanced design of an airscrew which operates on the basis of two principles, namely, the principle of leverage and the principle of the difference between a solid mass and an air mass. In this arrangement, the two propeller blades are employed as the solid mass or embodied airfoil with an ambient airfoil between them. This is to say, that the mass of air between the blades is in shape and form an airfoil consisting entirely of air. The purpose of this is to move a mass of air faster by taking a bite therein and so literally speaking, moving through the mass of air itself.

All conventional types of propellers built today are dependent on the boundary layer of air in front of the blade for aerodynamic efficiency. This type of efficiency, however, is actually limited, in that an aircraft could not be pulled through the air any faster than the boundary layer of the propeller would permit. Therefore, any change in power or size, number or arrangement of propeller blades cannot change the physical qualities of the boundary layer. If the velocity of a conventional type propeller is exceeded, the recessive qualities of air will reach the limit of stress and slide over the blades, thus reaching the limit of efficiency. In my propeller, a body of air exists between the aerodynamically shaped blades, which, when set into motion, will push a mass of air in an expansive fashion backwards. This mass of air cannot and will not reach a point of stress where it will break or slide, no matter what the velocity, because its contact with the solid mass of the propeller foil is by free body contact and not by adhesion as in the boundary layer of the conventional type propeller.

Reference is now made to the remaining figures of the drawings where I have shown for the purpose of simplicity, only one blade of my propeller. By comparison, it can be assumed that the blade embodies a lever, while the weight to be lifted is represented by the aircraft and is applied at the hub. The energy to lift the weight (aircraft) is furnished by the engine and is transmitted from the shaft to the propeller blade which, in turn, converts the rotary motion of the shaft into a forward movement by means of the aerodynamic twist of the blade. However, leverage performance cannot be obtained without the application of a fulcrum which in my propeller is provided in the form of a triangular extension at the leading edges 15 of the forward blades and at the trailing edges 17 of the rearward blades, as shown in FIGURE 1 of the drawings. The resistance of the ambient air to movement is comparable to the force of gravity as applied to a horizontal leverage system and like the air, the lines of force of gravity being ambient act simultaneously and freely through space to uniformly affect the weights or forces as applied at both ends of the lever so formed. It is, therefore, obvious that the fulcrum in this leverage system is important because it represents the center of gravity and as such, determines the degree of useful leverage which depends on the above mentioned extensions and the twist of the blades.

Leverage is a unique physical process which has no counterpart. It is applied in mechanics, hydraulics and pneumatics but has yet to be applied to aerodynamics. My propeller is based on the principle of leverage as will be pointed out in the following description taken with reference to the latter figures of the drawings. It is to be noted that new terms have been introduced in the description because two new characteristics have been discovered. These are . . . the cutting edge as marked by the symbol A and the eye, a space marked by the symbol E. FIGURES 4 and 5 are simple outlines of a conventional type propeller with FIGURE 4 being a top elevation and FIGURE 5 a side elevation. However, all of these FIGURES 4 to 11, are basically important for an understanding of my invention. FIGURE 4 shows the aerodynamic curve which is produced by the leading edge B and the trailing edge C of the propeller blade. As here shown, the edges B and C unite at a point marked A to form an uninterrupted curve. The shaded lines in FIGURE 4 indicate the air as it is cut upon each revolution of the propeller blade in a manner that is perpendicular to the plane of rotation. The side elevation in FIGURE 5, shows that leading edge B and trailing edge C both begin at the hub and then intersect at the point A to form one curved edge to produce the aerodynamic twist. Note in FIGURE 5, that edges B and C have axially different but radially equal starting points. In my propeller in FIGURE 7, the edges B and C have radially different but axially equal starting points. Both edges begin at the center of the hub 14 leading apart from each other outwardly to points A1 and A2 respectively, thus creating a new edge A, called the cutting edge. When two such blades are joined together as shown in FIGURE 9, they will create an airspace between them which is called the eye, as marked by the symbol E. This eye, when in motion, will thread into the air the same as a nut will thread onto a bolt, provided however, that the eye E is closed aerodynamically speaking, as at the point F in FIGURE 9. By comparison, a conventional type propeller will screw into the air shredding the air to pieces with each revolution of the blade, the same as a wood bit advances into wood. The cutting edges marked A in FIGURE 9, are straight edges axially which have a 45 degree or less offset axially. Both edges will perform as one when in motion and cut the air mass peripherically in one dimension, and in depth to the extent of their combined length in the other dimension. This two dimensional cut makes the air mass free to be then cut or sliced off in a third dimension by the leading edge B to the extent of the length of the blade and the air is now free to be threaded through the eye between the propeller blades at low speeds or through and over the eye E at the same time at high speeds. From this it will be seen that by this method a jet stream is created as shown by the symbol G in FIGURE 8. Unlike the shredded air mass in the conventional type propeller, this jet stream G, which cuts the air on three sides is not limited as to velocity except to power input only. Since the air is cut peripherically, it must go through the eye and cannot go around it as the physical structure of the propeller prevents this. Again it must be emphasized that such performance is only possible with the eye closed. If the eye E is open either radially or axially, whichever way, it will render the propeller ineffective. As shown in the Weichwald patent (1) and, the 120 degree radial opening in his design, leaves the eye between his blades wide open. FIGURES 10 and 11 represent such an open eye propeller with the spacings marked by the symbol D and due to the absence of any cutting edge at the ends of the blades, the air mass is not cut and, therefore, contsitutes a resistance to the jet stream. This resistance can be large or small depending on the axial spacing of the blades on the propeller hub.

Since the largest degree of pitch is on the outside of the propeller blade and the airfoil area is the largest on the outside and since the velocity is also greatest at this point, it follows, that the airmass in front of the propeller is attracted to the outer end of the propeller blades and in this fashion creates a vacuum at the hub or center of the propeller. Also due to the diminishing pitch at the hub 14 and the lesser speed or velocity at the center of rotation, such vacuum will be caused to leak through in reverse. However, in my propeller, such leak is prevented by the triangular extensions at the leading edges of the forward blade which extend far ahead of the leading edge of the rearward blade. This advance is to compensate for the difference in linear speeds between the outer ends of the blades and the center of rotation. Characteristically, this may be termed an aerodynamic fulcrum, but functionally, it is a turning point of two forces, namely . . . the negative pressure or vacuum at the front of the blades and the positive pressure of jetstream in back of the blades.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. A multi-blade screw propeller, comprising a supporting hub having two propellers with blades extending radially in axially spaced parallel and partially overlapping relation at opposite sides of said hub, said blades being of uniformly diminishing chord from said hub to the tips thereof, and characterized by the fact that the leading edges of the blades of the forward propeller are disposed at a swept back angle with respect to a radial line passing through the body of the blade and a trailing edge disposed rearwardly of and parallel with said radial line, and further characterized by the fact that the leading edge of the rearward propeller blades have their leading edges forward of and parallel with said radially extending line and trailing edges rearwardly of and disposed at a swept forward angle with respect to said radial line with the pitch of said blades increasing toward their ends.

2. A multi-blade screw propeller, comprising a supporting hub, two propellers having oppositely extending blades of airfoil section extending radially in axially spaced and partially overlapping relation at opposite sides of said hub, said blades having an aerodynamic twist and being of uniformly increasing pitch from said hub to the tips thereof, and characterized by the fact that the leading edges of the blades of the forward propeller are inclined at a reclining angle extending along a straight line tangent to the axis of the hub and trailing edges disposed rearwardly of and parallel to a radial line passing through the axis of the blade, and further characterized by the fact that the leading edges of the blades of the rearward propeller have their leading edges forward of and parallel with said radial line and trailing edges rearwardly of and extending from their tips to said hub along a line tangent to the axis of the hub.

3. A multi-bladed propeller for aircraft, comprising a hub having pairs of oppositely extending blades of airfoil section extending radially from opposite sides of said hub and disposed in axially spaced parallel partially overlapping relation with the leading edges of the forward propeller blades being inclined at a swept back angle towards the ends thereof and the leading edges of the blades of the rearward propeller being disposed along a line substantially parallel with a line passing centrally through the chord of said blades and the axis of rotation, all characterized by the fact that the blades of each pair have an increasing aerodynamic pitch toward the ends thereof and provide a spirally defined air slot of corresponding aerodynamic form therebetween.

4. A screw propeller, comprising a hub having a blade extending radially from opposite sides of said hub, said blades being of airfoil cross-section with an aerodynamic twist having a maximum angle of attack or pitch at their outer ends, characterized by the fact that said blades are of uniformly decreasing chord dimension from the hub outwardly with their leading edges extending to the center of the hub and swept back at an angle along a line tangent to the axis of said hub and with their trailing edges substantially parallel with a radial line passing through the mean center line of the blade.

5. A screw propeller, comprising a hub having blades of airfoil cross-section extending radially from opposite sides of said hub, said blades having an increasing aerodynamic twist with the maximum pitch at their outer ends, and characterized by the fact that said blades are of uniformly decreasing chord dimension from the hub outwardly with their trailing edges swept back and extending at an angle with respect to the centers thereof and leading edges substantially parallel with a radial line passing through the longitudinal axis of the hub.

6. A multi-blade screw propeller, comprising a supporting hub having two blades extending radially from said hub as a first forward propeller, a second set of similar blades carried by said hub forming a rearward propeller, the blades of the forward and rearward propellers being of uniformly diminishing width and increasing pitch from said hub to the tips thereof and in partially overlapping relation at opposite sides of said hub, and characterized by the fact that the leading edges of the forward blades of the first propeller are inclined at a swept back angle along a line tangent to the axis of said hub and with respect to a radial line passing through the center of the blades and the leading edges of the blades of the rearward propeller have their leading edges forward of and substantially parallel with respect to a radial line passing through the axis of rotation of said hub.

References Cited by the Examiner

UNITED STATES PATENTS

| | | | |
|---|---|---|---|
| 890,973 | 6/1908 | Filippi | 170—159 |
| 1,977,072 | 10/1934 | Lyman | 170—159 |
| 2,116,054 | 5/1938 | Weichwald | 170—165 |
| 2,116,055 | 5/1938 | Weichwald | 170—159 |
| 2,390,879 | 12/1945 | Hagen | 170—159 |

FOREIGN PATENTS

| | | |
|---|---|---|
| 1,010,026 | 3/1952 | France. |

MARTIN P. SCHWADRON, *Primary Examiner.*

E. A. POWELL, JR., *Assistant Examiner.*